Figure 1:
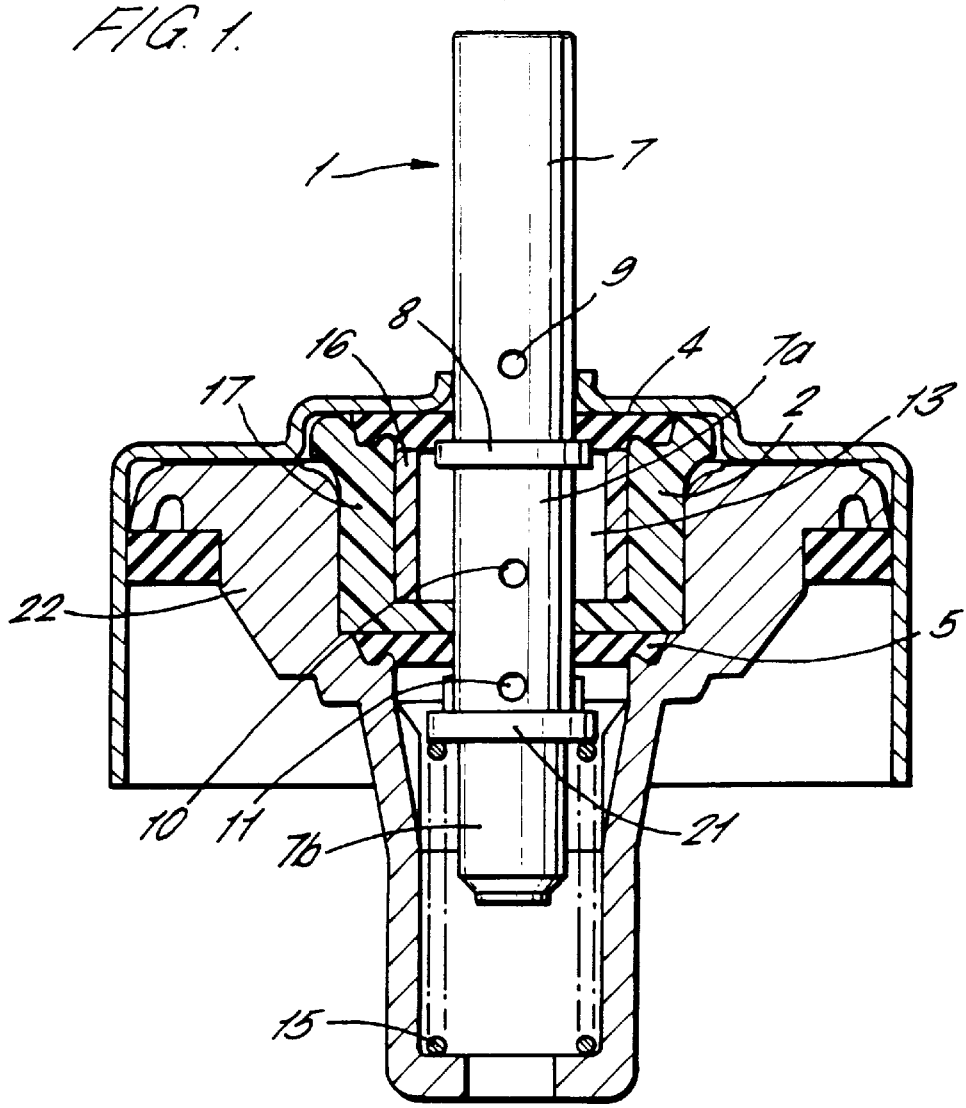

United States Patent [19]
Warby

[11] Patent Number: 6,095,182
[45] Date of Patent: Aug. 1, 2000

[54] METERING VALVES FOR PRESSURISED DISPENSING CONTAINERS

[75] Inventor: Richard John Warby, Wisbech, United Kingdom

[73] Assignee: Bespak plc, Norfolk, United Kingdom

[21] Appl. No.: 09/357,937

[22] Filed: Jul. 21, 1999

Related U.S. Application Data

[63] Continuation of application No. 09/108,303, Jul. 1, 1998.

[30] Foreign Application Priority Data

| Sep. 3, 1997 | [GB] | United Kingdom | 9718693 |
| Oct. 13, 1997 | [GB] | United Kingdom | 9721684 |

[51] Int. Cl.[7] .......................................................... F16L 7/00
[52] U.S. Cl. .......................... 137/375; 251/353; 251/354; 251/368; 222/402.1; 222/183
[58] Field of Search ...................................... 251/353, 354, 251/368; 137/375; 222/183, 402.1

[56] References Cited

U.S. PATENT DOCUMENTS

| 3,276,086 | 10/1966 | Clouzeau et al. | 251/353 |
| 3,313,459 | 4/1967 | Mizuguchi | 251/353 |
| 4,405,178 | 9/1983 | Brandenburg | 251/353 |

FOREIGN PATENT DOCUMENTS

| 45 551 | 8/1986 | Austria . |
| 0101157 | 2/1984 | European Pat. Off. . |
| 689 28 465 T2 | of 0000 | Germany . |
| 41 31 436 A1 | 3/1993 | Germany . |
| 195 04 502 A1 | 8/1996 | Germany . |
| 2178398A | 2/1987 | United Kingdom . |
| 2206100 | 12/1988 | United Kingdom . |
| 2 216 872 | 10/1989 | United Kingdom . |
| WO 88/07010 | 9/1988 | WIPO . |
| WO 95/30607 | 11/1995 | WIPO . |
| WO 96/25138 | 8/1996 | WIPO . |

*Primary Examiner*—A. Michael Chambers
*Attorney, Agent, or Firm*—Smith, Gambrell & Russell, LLP; Beveridge, DeGrandi, Weilacher & Young Intellectual Property Group

[57] ABSTRACT

This invention relates to metering valves for pressurised dispensing containers.

The present invention provides a metering valve for use with a pressurised dispensing container. The valve comprises a valve stem (1) co-axially slidable within a valve member (2) defining an annular metering chamber (13). Outer and inner annular seals (4, 5) are operative between the respective outer and inner ends of the valve member (2) and the valve stem (1) to seal the annular metering chamber (13) therebetween. Wherein the valve member (2) comprises a main component part (17) and a liner (16) lining at least a portion of an inner surface of the main component part (17). The liner (16) is made of a material selected from, a ceramic, a metal or a glass and the main component part (17) is made of another material.

5 Claims, 1 Drawing Sheet

METERING VALVES FOR PRESSURISED DISPENSING CONTAINERS

This is a continuation of U.S. patent application Ser. No. 09/108,303 filed Jul. 1, 1998.

This invention relates to metering valves for pressurised dispensing containers.

Conventional metering valves for use with pressurised dispensing containers comprise a valve stem coaxially slidable within a valve member defining an annular metering chamber, and outer and inner annular seals operative between the respective outer and inner ends of the valve stem and the valve member to seal the metering chamber therebetween. The valve stem is hollow whereby in a non-dispensing position of the valve stem, the metering chamber is connected to the container and charged with product therefrom. The valve stem is movable against the action of a spring to a dispensing position wherein the metering chamber is isolated from the container and vented to atmosphere for the discharge of product.

A problem with this type of metering valve, especially with liquid propellant having a particulate product suspended therein, is the deposition of the solid product on the internal surfaces of the metering chamber and other components after a number of operation cycles and/or storage. This can lead to reduced efficiency of operation of the valve since deposition of the product reduces the amount of active drug available to be dispensed (due to the active drug remaining on the surfaces of the chamber). Prior art devices rely on the container and attached valve being shaken in an attempt to dislodge the deposited particles as a result of the movement of the liquid propellant and product mixture. However, whilst this remedy is effective within the body of the container itself, it is not effective for particles deposited on the inner surfaces of the metering chamber. As the size of the chamber is significantly smaller, the restricted flow of fluid in the metering chamber (caused by the tortuosity of the flow path through the chamber) means that the fluid in the metering chamber does not move with enough energy to adequately remove the deposited particles.

It is therefore an object of the present invention to provide a metering valve in which deposition of the product and active drug component on the walls of the metering chamber is minimised.

According to the present invention there is provided a metering valve for use with a pressurised dispensing container, the valve comprising a valve stem co-axially slidable within a valve member defining an annular metering chamber, outer and inner annular seals operative between the respective outer and inner ends of the valve member and the valve stem to seal the annular metering chamber therebetween, wherein the valve member comprises a main component part and a liner lining at least a portion of an inner surface of the main component part, wherein the liner is made of a material selected from a ceramic, a metal or a glass and the main component part is made of another material.

Preferably the liner is formed as a separate component insertable within the main component part.

Alternatively the liner is formed as a co-moulding with the main component part.

Preferably the thickness in the radial direction of the liner is less than or equal to 0.6 mm.

In one embodiment the thickness in the radial direction of the liner is 0.5 mm.

Figure 2:
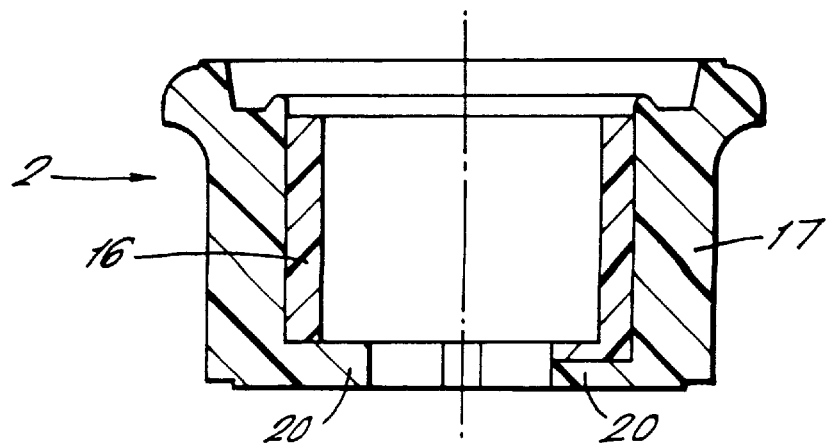

Particular embodiments of the present invention will now be described, by way of example only, with reference to the accompanying drawings, in which:

FIG. 1 is a cross-sectional view of a metering valve according to the present invention; and FIG. 2 is a cross-sectional view of the metering chamber of the metering valve of FIG. 1, showing two alternative versions of the inner liner on the right and left hand sides.

The metering valve of FIG. 1 includes a valve stem 1 which protrudes from and is axially slidable within a valve member 2 defining an annular metering chamber 13. The valve member 2 is located within a valve body 22 which is positioned in a pressurised container (not shown). The metering valve is held in position by means of a ferrule crimped to the top of the container.

An outer seal 4 and an inner seal 5 of elastomeric material extend radially between the valve stem 1 and the valve member 2. The outer seal 4 is radially compressed between the valve member 2 and the valve stem 1 so as to provide positive sealing contact, the compression being achieved by using a seal which provides an interference fit on the valve stem 1 and/or by the crimping of a ferrule onto the pressurised container during assembly.

The "upper end" 7 (i.e. the end which protrudes from the valve) of the valve stem 1 is a hollow tube which is closed at a flange 8, which flange 8 is located within the metering chamber 13. The valve stem 1 includes a discharge port 9 extending radially through the side wall of the valve stem 1 adjacent to the flange 8. Formed in an intermediate section 7a of the valve stem 1, which is also hollow, is a passage, comprising a pair of spaced radial ports 10 and 11 which are inter-connected through the central cavity.

A spring 15 extending between a second flange 21 located between and separating the intermediate section 7a and a lower section 7b of the valve stem 1, biases the valve stem 1 in a "non-dispensing" position in which the flange 8 is held in sealing contact with the outer seal 4. The second flange 21 is located outside the valve member 2, but within the valve body 22.

The metering chamber 13 is sealed from the atmosphere by the outer seal 4 and from the pressurised container (not shown) to which the valve is attached by the inner seal 5. In the illustration of the valve shown in FIG. 1, the radial ports 10 and 11 together with the central cavity connect the metering chamber 13 with the container so that in this condition the metering member 13 would be charged with product to be dispensed.

Upon depression of the upper end 7 of the valve stem 1 relative to the valve member 2 so that it moves inwardly into the container, the radial port 10 is closed off as it passes through the inner seal 5 so that the metering chamber 13 is isolated from the contents of the pressurised container. Upon further movement of the valve stem 1 in the same direction the discharge port 9 passes through the outer seal 4 into communication with the metering chamber 13. In this "dispensing" position the product in the metering chamber 13 is free to be discharged to the atmosphere via the discharge port 9 and the hollow upper end 7 of the valve stem 1.

When the valve stem 1 is released the biassing of the return spring 15 causes the valve stem 1 to return to its original position, the metering chamber 13 as a result becoming recharged in readiness for further dispensing operations.

Conventional valve members are formed as a single moulding from one material such as acetal, polyester or nylon which are prone to the deposition problems described above. It has been found in experiments that deposition of the active drug on the wall of a metering chamber made from a ceramic or a glass is significantly reduced, compared to conventional valve member materials such as acetal, polyester or nylon.

In the present invention the valve member 2, as shown in FIG. 2, comprises a main component part 17 and an inner annular liner 16 assembled or formed coaxially and in contact with one another. The main component part 17 is manufactured from a conventional material for such a component, for example acetal, polyester or nylon. In one embodiment the inner liner 16 is manufactured from a ceramic or a glass. The inner liner 16 is "thin-walled", having a typical thickness in the radial direction of between 10% and 30% of the total radial thickness of the valve member 2. In one example the thickness in the radial direction of the inner liner 16 is 0.5 mm and the thickness of the main component part 17 1.5 mm.

The left-hand and right-hand sides of FIG. 2 show two alternate versions of the inner liner 16. On the left-hand side the inner liner 16 extends axially along the length of the annular metering chamber 13. On the right-hand side the inner liner 16 additionally extends radially to cover a base 20 of the valve member 2, which lies adjacent the inner seal 5. The version shown on the right-hand side of FIG. 2 has the advantage that deposition of the active drug on the base 20 of the valve member 2 is minimised an nylon. An advantage of forming the ceramic or glass liner 16 as a thin-walled component is that the difficulty and cost of forming simple annular shapes out of ceramics or glass is less than the difficulty and cost of forming complex shapes, as would be required to produce the entire valve member 2 in these materials.

The ceramic or glass liners 16 are preferably formed as separate components insertable within the main component part 17 of the metering valve 2.

The present invention has particular application to pharmaceutical metering valves. Whilst the invention has been described with reference to ceramic or glass and to a particular type of valve member, it will be apparent that the liner 16 could be inserted/utilised in other types of valve member without departing from the scope of the present invention.

What is claimed is:

1. A metering valve for use with a pressurised dispensing container containing a product for dispensation, the valve comprising a valve stem co-axially slidable within a valve member defining an annular metering chamber, outer and inner annular seals operative between the respective outer and inner ends of the valve member and the valve stem to seal the annular metering chamber therebetween, wherein the valve member comprises a main component part and a liner lining at least a portion of an inner surface of the main component part, the liner defining at least a portion of an inner surface of the metering chamber, wherein the liner is made of a material selected from a ceramic or a glass, and the main component part is made of another material such that, in use, deposition of the product on the inner surface of the metering chamber is reduced.

2. A metering valve as claimed in claim 1, wherein the liner is formed as a separate component insertable within the main component part.

3. A metering valve as claimed in claim 1, wherein the liner is formed as a co-moulding with the main component part.

4. A metering valve as claimed in claim 1 wherein the thickness in the radial direction of the liner is less than or equal to 0.6 mm.

5. A metering valve as claimed in claim 1 wherein the thickness in the radial direction of the liner is 0.5 mm.

* * * * *